United States Patent
Chen et al.

(10) Patent No.: US 10,674,156 B2
(45) Date of Patent: *Jun. 2, 2020

(54) IMAGE MANAGEMENT

(71) Applicant: UJET, Inc., San Francisco, CA (US)

(72) Inventors: Eli Chen, San Mateo, CA (US); Anand Janefalkar, San Francisco, CA (US)

(73) Assignee: UJET, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/201,658

(22) Filed: Nov. 27, 2018

(65) Prior Publication Data
US 2019/0098311 A1 Mar. 28, 2019

Related U.S. Application Data

(63) Continuation of application No. 15/342,489, filed on Nov. 3, 2016, now Pat. No. 10,148,964.

(51) Int. Cl.
| | |
|---|---|
| H04N 19/137 | (2014.01) |
| H04L 29/06 | (2006.01) |
| H04N 21/2343 | (2011.01) |
| H04N 19/132 | (2014.01) |
| H04N 21/647 | (2011.01) |
| H04N 19/13 | (2014.01) |
| H04N 19/172 | (2014.01) |
| H04N 19/43 | (2014.01) |
| H04N 19/86 | (2014.01) |

(52) U.S. Cl.
CPC ....... *H04N 19/137* (2014.11); *H04L 65/4084* (2013.01); *H04L 65/602* (2013.01); *H04L 65/607* (2013.01); *H04L 65/80* (2013.01); *H04N 19/13* (2014.11); *H04N 19/132* (2014.11); *H04N 19/172* (2014.11); *H04N 19/43* (2014.11); *H04N 19/86* (2014.11); *H04N 21/234363* (2013.01); *H04N 21/234381* (2013.01); *H04N 21/64738* (2013.01)

(58) Field of Classification Search
None
See application file for complete search history.

(56) References Cited

U.S. PATENT DOCUMENTS

| | | | | |
|---|---|---|---|---|
| 5,555,441 A | * | 9/1996 | Haddad | H04N 7/17318 348/E7.071 |
| 5,621,660 A | * | 4/1997 | Chaddha | H04N 7/17336 348/E7.073 |
| 5,835,138 A | * | 11/1998 | Kondo | H04N 5/23248 348/207.99 |
| 5,903,734 A | * | 5/1999 | Chida | H04L 29/06 709/231 |
| 8,781,883 B2 | * | 7/2014 | Whitaker | G06Q 10/0639 705/7.39 |

(Continued)

*Primary Examiner* — Peter D Le

(74) *Attorney, Agent, or Firm* — Rimon Law

(57) ABSTRACT

A communication system is configured to automatically adapt an image sequence in response to movement of a camera used to capture the image sequence. The adaptation includes a reduction in the data size of the image sequence and can occur in real-time as the image sequence is captured. The adaptation further includes restoration of the data size of the image in response to a reduction in movement of the camera. This approach allows for the communication of quality images shortly after movement of the has been reduced.

14 Claims, 1 Drawing Sheet

(56) References Cited

U.S. PATENT DOCUMENTS

| | | | |
|---|---|---|---|
| 2002/0040383 A1* | 4/2002 | Zehavi | H04N 1/00132 709/200 |
| 2002/0069101 A1* | 6/2002 | Vincent | G06Q 30/02 705/14.53 |
| 2002/0069265 A1* | 6/2002 | Bountour | H04N 7/181 709/219 |
| 2003/0120802 A1* | 6/2003 | Kohno | H04L 29/06 709/237 |
| 2003/0189669 A1* | 10/2003 | Bowser | H04N 5/445 348/564 |
| 2003/0194007 A1* | 10/2003 | Chen | H04N 19/51 375/240.2 |
| 2004/0008772 A1* | 1/2004 | Kojima | H04N 5/232 375/240.08 |
| 2004/0080618 A1* | 4/2004 | Norris | G06K 9/00771 348/207.1 |
| 2004/0120591 A1* | 6/2004 | Brower | H04N 19/63 382/240 |
| 2005/0104848 A1* | 5/2005 | Yamaguchi | G06F 1/1626 345/156 |
| 2005/0147167 A1* | 7/2005 | Dumitras | H04N 19/139 375/240.16 |
| 2005/0168614 A1* | 8/2005 | Okada | H04N 5/23248 348/335 |
| 2005/0198189 A1* | 9/2005 | Robinson | G06F 3/1454 709/217 |
| 2005/0262085 A1* | 11/2005 | Durocher | G06F 8/38 |
| 2006/0026294 A1* | 2/2006 | Virdi | H04N 21/234381 709/232 |
| 2006/0072018 A1* | 4/2006 | Inaba | H04N 5/23248 348/208.99 |
| 2006/0218302 A1* | 9/2006 | Chia | H04L 47/10 709/245 |
| 2007/0105589 A1* | 5/2007 | Lu | H04W 88/02 455/556.2 |
| 2007/0136469 A1* | 6/2007 | Nusbickel | H04L 67/1008 709/226 |
| 2007/0177604 A1* | 8/2007 | Ozawa | H04L 47/10 370/395.2 |
| 2007/0291114 A1* | 12/2007 | Oshima | H04N 5/23248 348/126 |
| 2008/0136926 A1* | 6/2008 | Hatanaka | H04N 5/23248 348/208.99 |
| 2009/0119730 A1* | 5/2009 | Perlman | A63F 13/12 725/114 |
| 2010/0141762 A1* | 6/2010 | Siann | H04N 7/185 348/143 |
| 2010/0225580 A1* | 9/2010 | Yoon | G06F 3/0304 345/157 |
| 2011/0234825 A1* | 9/2011 | Liu | H04N 5/23248 348/208.5 |
| 2011/0279640 A1* | 11/2011 | Choi | H04N 7/148 348/14.12 |
| 2012/0004960 A1* | 1/2012 | Ma | G06Q 30/0241 705/14.4 |
| 2012/0057034 A1* | 3/2012 | Tanaka | H04N 5/23212 348/208.1 |
| 2012/0169828 A1* | 7/2012 | Lee | H04L 65/1069 348/14.02 |
| 2013/0301706 A1* | 11/2013 | Qiu | H04N 5/23258 375/240.03 |
| 2014/0344469 A1* | 11/2014 | Nicholls | H04L 65/607 709/231 |

* cited by examiner

IMAGE MANAGEMENT

CROSS-REFERENCE TO RELATED APPLICATIONS

This application is a continuation of U.S. application Ser. No. 15/342,489 filed on Nov. 3, 2016 an entitled "Image Management," which is incorporated herein by reference.

BACKGROUND

Field of the Invention

The invention is in the field of communications and more specifically in the field of image distribution.

Related Art

It is common for images and video to be communicated via communication systems such as cellular networks and the Internet. Such communication may be based on a variety of alternative standards most of which use some sort of data compression and/or simplification. Typically, rapidly changing video content requires that a greater amount of data be communicated because this changing content is harder to compress and/or simplify relative to more static content.

SUMMARY

Some communication standards handle bursts of image data by dynamically reducing image resolution. This helps manage network traffic and prevents a single source of image sequences from consuming too much of a network resource. Unfortunately, because this dynamic response is responsive to the received data size, the reduced image resolution may continue for an undesirably long time period after a burst of image data has subsided. This approach has no way of predicting when the burst of image data will end and can only wait for a period of reduced data transmission before concluding that image resolution can be restored to a default value. For example, if a smartphone is panned while transmitting real-time video, a burst of video data can result. In response to this burst, the resolution of the video may be reduced so as to avoid overloading of the communication channel. The reduction in resolution may last for several seconds after the panning of the smartphone is ended, e.g., until the system can conclude from several seconds of reduced data size that the burst had concluded. The reduction in resolution is optionally under control of the smartphone operating system or communication logic stored therein. In some embodiments, the reduction in resolution is automatically applied by part of a communication network.

Various embodiments of the invention mitigate the problems associated with automatic reductions in image resolution that are based on detected data size. This is done by detecting movement of a smartphone or other mobile image recording device, and adjusting data size in response to this detected movement. By adjusting data size in response to movement rather than communicated data (size), the adjustment in data size can be reversed more quickly once the movement stops. The data size can be reduced (in response to the movement) by reducing image resolution and/or frame rate. The movement is typically detected using motion sensors internal to the device.

In an illustrative application, when a user pans a smartphone to an object of interest, a reduction in image resolution (responsive to just a received burst of data) can result in the object of interest being poorly imaged for several seconds after the smartphone is moved—because the resolution has been reduced and the device is trying to determine if the burst of data is over by merely observing that a reduced data size has been received for several seconds. In contrast, when the reduction and restoration of image resolution is responsive to movement of the smartphone, the resolution can be restored once movement has halted, without several seconds of delay. This allows quality images to be captured more quickly.

Some embodiments of the invention are applied to communication between a user and a customer service representative. Quality images can be provided from a mobile device of the customer to the customer service representative, without undue delay. The systems and methods disclosed herein are optionally applied to CRM (Customer Relationship Management) systems such as those disclosed in co-pending patent application Ser. No. 14/798,468, 14/831,129 and 14/850,142. The disclosures of these applications are hereby incorporated herein by reference.

Various embodiments of the invention include a mobile video recording device comprising: a camera configured to record video; a motion sensor configured to detect movement of the video recording device; a wireless output including an antenna and configured to communicate the video; video transmission logic configured to reduce a data size of the video communicated via the wireless output, the reduction being in response to an output of the motion sensor, the output of the motion sensor being indicative that the video recording device is being moved; and a microprocessor configured to execute at least the video transmission logic.

Various embodiments of the invention include a customer communication system comprising: an input/output configured to communicate to a remote user device via a communication networks; an agent interface configured for a customer service agent to communicate to a remote user device via the input/output, the agent interface including a control configured to control video transmission logic on the remote user device, the video transmission logic being configured to reduce a data size of a sequence of images sent to the input/output, the reduction being in response to movement of the remote user device; and a microprocessor configured to execute at least the agent interface.

Various embodiments of the invention include a method of communicating video, the method comprising: capturing a sequence of images using a camera; communicating the sequence of images to a remote destination via a wireless output; detecting an increased movement of the camera while communicating the sequence of images; reducing a data size of the sequence of images in response to the detected increased movement; detecting a reduced movement of the camera while communicating the sequence of images; and increasing the data size of the sequence of images in response to the detected decreased movement. The method optionally further includes testing of a communication channel to determine a bandwidth threshold.

DETAILED DESCRIPTION

As used herein, the term "data size" of a video is specifically to mean "the amount of data (e.g., number of bytes) used to communicate the video in real-time from a source to a remote destination over a communication network." The data size may be expressed per a unit of time such as Mbits/second.

As used herein, the term "communication channel" is meant to mean a digital or analog channel for communicating between two endpoints. A communication channel can include wired and/or wireless segments. For example, a communication channel can include a wireless link between a smartphone and a cellular tower, a wired link between the cellular tower and an internet access point and a TCP/IP link between the access point and a final destination.

As used herein, the term "bandwidth threshold" is meant to mean a data size that can be communicated through a specific communication channel without a reduction in the data size and/or a reduction in the quality of the data. A bandwidth threshold may be a physical limit or may be artificially set to enabling sharing of a communication resource.

As used herein, the term "image resolution" is meant to mean the number of pixels that form the image and the depth of each pixel. For example, an image may consist 480 by 640 pixels each having a depth of 8 bits. The depth of a pixel represents the number of colors or grayscale levels that can be represented in that pixel.

As used herein, the term "video" is meant to mean a sequence of images having a frame rate and image resolution, which may vary over time. Video includes images compressed using a (lossless or lossy) compression algorithm. For example, video can include images compressed using H.263 and the various types of "frames" defined in this standard.

As used herein, the term "logic" is meant to mean hardware, firmware and/or software stored on a non-transient computer readable medium. Logic may be used to configure a general purpose computing device to perform specific operations.

Figure 1:
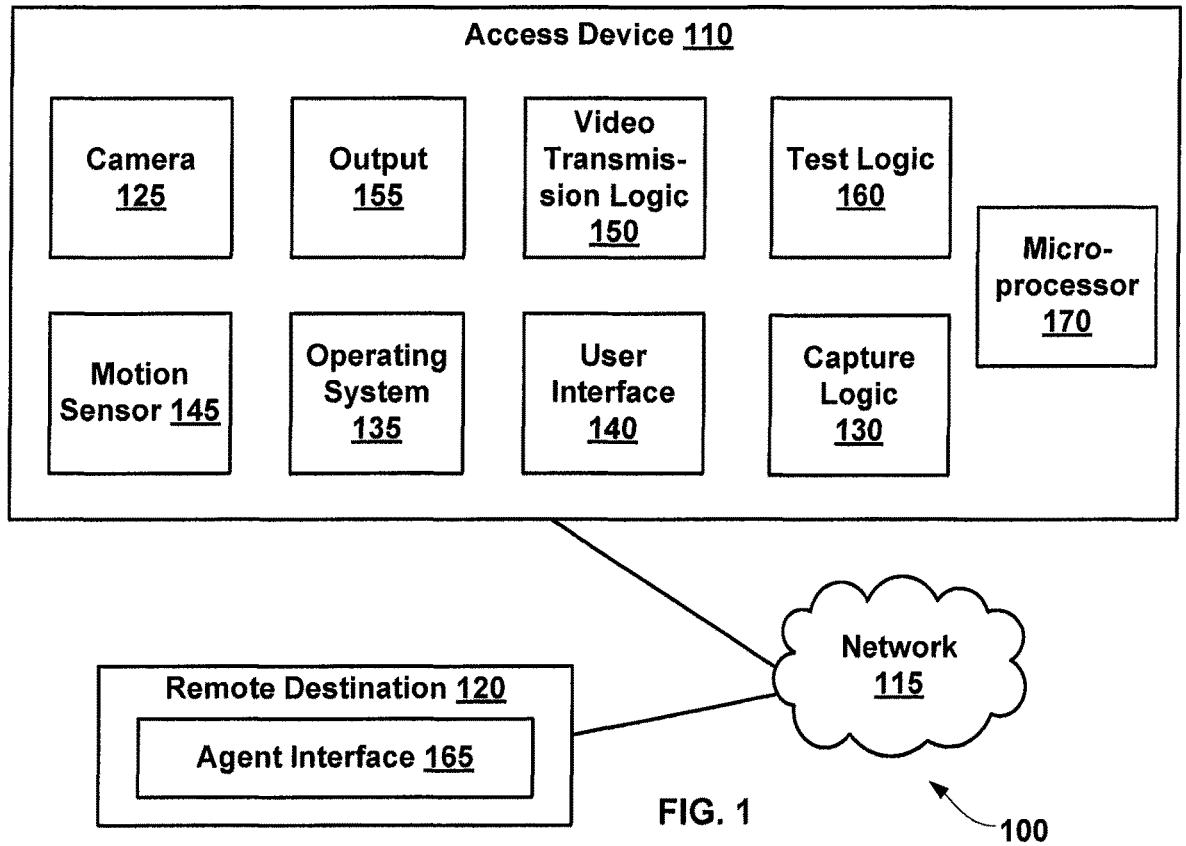
FIG. 1 illustrates a communication system, according to various embodiments of the invention.

FIG. 1 illustrates a Communication System 100, according to various embodiments of the invention. Communication System 100 includes one or more Access Device 110 configured to communicate to and from one or more Remote Destination 120 via a Network 115. Network 115 may be a telephone network, a cellular network, a local network, a wireless network, a computer network (e.g., the internet), and/or some other communication network. Typically, Network 115 is configured to enable communication between multiple sources and destinations. The communication includes digital data and also optionally analog audio and/or image data.

Access Device 110 is a mobile device such as a smartphone, tablet computer, steerable camera system, vehicle mounted camera, and/or the like. For example, Access Device 110 may include a handheld computing device or a camera mounted on a mount whose pan and/or tilt is controllable. In some embodiments, Access Device 110 includes a plurality of movable security cameras and a local monitoring station. The security cameras may be connected to and controllable from the monitoring station.

Access Device 110 includes one or more Camera 125 configured to capture a sequence of (digital) images. Camera 125 may be configured to generate image data in a wide variety of compressed or uncompressed formats. For example, in some embodiments Camera 125 is configured to provide raw video data while in other embodiments Camera 125 is configured to provide compressed video data.

Camera 125 is optionally controlled using Capture Logic 130. Capture Logic 130 can include camera functions of an Operating System 135 of Access Device 110, and/or can include a separate application executing on Access Device 110. For example, in some embodiments Capture Lotic 130 includes functions for selecting between single photos of various types and video. In some embodiments Capture Logic 130 includes a video conferencing application (e.g., Skype) or an application specifically configured to communicate to a customer relationship management system. Such specifically configured applications optionally allow control of Camera 125, and/or any other element of Access Device 110, from Remote Destination 120.

Capture Logic 130 is typically controlled by a user via a User Interface 140. User Interface 140 includes a display, logic configured to present a graphical user interface to a user, mechanisms (e.g., a microphone, keys or a touch screen) for a user to enter commands and data, and/or a speaker. User Interface 140 is optionally managed by Operating System 135. For example, User Interface 140 may be under the control of an Android or iOS operating system.

Access Device 110 further comprises a Motion Sensor 145. Motion Sensor 145 includes one or more motion detection devices such as an accelerometer and/or gyroscope. Motion Sensor 145 is configured to detect movement and/or acceleration of Access Device 110. Motion Sensor 145 can include the motion detection electronics found in most smartphones. In some embodiments, Motion Sensor 145 includes a drive system configured to move Access Device 110. For example, if Access Device 110 includes a remotely controlled camera, Motion Sensor 145 can include the motors, controls, and/or electronic sensors associated with moving the remotely controlled camera. In this case, movement is detected indirectly by, for example, detecting/providing a motor current or by interpreting output of a position sensor.

Access Device 110 further includes Video Transmission Logic 150. Video Transmission Logic 150 is configured to preemptively reduce a data size of communicated video. This reduction is in response to an output of Motion Sensor 145. For example, when the output of Motion Sensor 145 indicates that Camera 125 is being moved, the data size is automatically reduced. Preferably the data size is reduced such that a bandwidth threshold of the communication channel is not reached. The reduction is optionally performed so as to keep the data size of the sequence of images below a specific threshold, e.g., a bandwidth threshold. The reduction in data size performed by Video Transmission Logic 150 preferably avoids a reduction in data size by Operating System 135 and/or Network 115. The reduction in data size may be performed to avoid automatic reduction subject to a communication standard and/or bandwidth limit.

Video Transmission Logic 150 is further configured to restore the data size of the communicated video, to a prior value. This restoration is done in response to detecting that the video recording device has stopped moving (or is moving at a reduced speed). Specifically, if the output of Motion Sensor 145 indicates that Access Device 110 has stopped moving, or slowed substantially, Video Transmission Logic 150 is configured to increase the data size of transmitted video. The increase is optionally to a prior data size that was used prior to the movement detection. In various embodiments, the restoration occurs within 0.5, 1, 1.5, 2, 3 or 4 seconds of the end of the movement. By making the data reduction and restoration responsive to movement, the quality of the video is not reduced by the movement for as long as systems of the prior art. The quality may be reduced only for less than a tenth or less than a quarter second after movement stops.

In various embodiments, Video Transmission Logic 150 is configured to reduce the data size of the video by reducing resolution of the video, by reducing a frame rate of the video, by reducing depth of video pixels, and/or by changing a compression of the video. In one example, video resolution is reduced from 1280×720 pixels to 720×480 pixels. In another example, data size is reduced by changing pixel depth from 16 bit color to 8 bit black & white. In another example, data size is reduced by changing the frame rate of the video from at least 24 frames/second to less than 24 frames/second.

In various embodiments, Video Transmission Logic 150 is configured to reduce data size of the video by controlling compression of the video. For example, Video Transmission Logic may reduce data size by causing a greater amount of compression, by causing the compression to generate different frame types than would otherwise be generated, e.g., more B-frames, and/or the like. The data size of the video is optionally reduced by changing from a lossless compression algorithm to a lossy compression algorithm. For example, compression may change from H.263 to MPEG-4.

Video Transmission Logic 150 is optionally configured to reduce data size in proportion to the output of the motion sensor. For example, an output that indicates moderate movement may result in a moderate amount of data size compression, while an output that indicates greater movement may result in a greater amount of data size compression.

Video Transmission Logic 150 is optionally configured to reduce data size of video in response to a destination of the video. For example, Video Transmission Logic 150 may not reduce the data size of video directed at a first destination and may reduce the data size of video directed at a second destination, other factors being equal. In a specific example, Video Transmission Logic 150 may be configured to change the data size of video sent to Remote Destination 120 but not to other destinations. As discussed further elsewhere herein, Remote Destination 120 is optionally part of a customer relationship management system configured for customer service agents to provide support to users of Access Device 110. See, for example, U.S. patent application Ser. Nos. 14/798,468, 14/831,129 and 14/850,142. In some embodiments, Video Transmission Logic 150 is responsive to commands sent from Remote Destination. For example, these commands may turn on and off data size reduction.

Access Device 110 further includes an Output 155. Output 155 includes hardware configured to communicate data to remote devices via a computer network. For example, Output 155 can include an antenna configured to communicate over a Wifi or cellular network, or a serial or Ethernet port. Output 155 is optionally configured to communicate video in data packets using, for example, TCP/IP. In some embodiments Output 155 is under the control of Operating System 135 and includes logic configured to automatically limit data size when a burst of data is detected. Unlike Video Transmission Logic 150, the default OS logic may be configured to limit data size until a period of reduced data is detected, resulting in a delay in restoration of image quality.

Access Device 110 optionally further includes Test Logic 160, test logic configured to test a communication channel to detect an automatic modification of the video in response to a data size of the video. This modification may occur at a bandwidth threshold of the communication channel. For example, in some embodiments, Test Logic 160 is configured to send data of various data sizes (e.g., at various bytes/second) to Remote Destination 120 and to detect the data size at which the quality of the data received at Remote Destination 120 is degraded as a result of a bandwidth limit or as a result of automatic reduction by logic other than Video Transmission Logic 150. The degradation may be detected at Remote Destination 120 and reported to Test Logic 160.

The detected data size at which the quality of the data received is degraded is optionally used to set a threshold at which Video Transmission Logic 150 reduces data size. For example, if the detected data size is detected to be "X Mb/s", then Video Transmission Logic 150 may be configured to reduce/limit data size (in response device movement) to 80% of "X Mb/s." This avoids a reduction in data size that is not responsive to movement of Access Device 110, and avoids a delay in restoring the data size.

In some embodiments, Test Logic 160 is configured to perform a test for each time a new communication channel is established between Access Device 110 and a Remote Destination 120. In some embodiments, Test Logic 160 is configured to perform a test in response to a command received from Remote Destination 120.

Remote Destination 120 optionally includes an Agent Interface 165 configured to receive images sent from Access Device 110. Agent Interface 165 is can be an embodiment of the Agent Interface taught in patent application Ser. No. 14/798,468, 14/831,129 and/or 14/850,142. Agent Interface 165 may be configured for communication between a user of Access Device 110 and a customer service agent. Agent Interface 165 optionally includes command inputs configured for the customer service agent to activate functionality of Video Transmission Logic 150 and/or to perform bandwidth tests using Test Logic 160. In a specific example, a customer service agent may receive a poor quality image from Access Device 110 and in response the customer service agent may send a command to activate Video Transmission Logic 150 to facilitate receiving a better quality image. Specifically Agent Interface 165 may be configured for a customer service agent to communicate to Access Device 110 via Network 115 and Output 155; and to control Video Transmission Logic 150 so as to reduce the data size of a sequence of images sent from Access Device 110 in response to movement of Access Device 110. Agent Interface 165 optionally further includes a control configured to store at least part of the sequence of images in a memory of Remote Destination 120.

The Video Transmission Logic 150 illustrated in FIG. 1 may be disposed within a mobile device of a user, e.g., a smartphone. Alternatively, Video Transmission Logic 150 may be disposed in a control station that is in communication with more or more cameras. For example, a central control station may be connected to a plurality of cameras distributed around a facility. The cameras may be connected wirelessly or by wire. The cameras may also be steerable in response to commands received from the control system. The cameras and control station are an example of Access Device 110. In this case the control station is configured to communicate over Network 115 to an instance of Remote Destination 120 used to remotely monitor/manage one or more control station.

Access Device 110 further includes a digital Microprocessor 170 configured to execute logic within Access Device 110. For example, Microprocessor 170 may be programmed using software instructions of Video Transmission Logic 150 to perform the specific functions of Video Transmission Logic 150 discussed herein.

Figure 2:
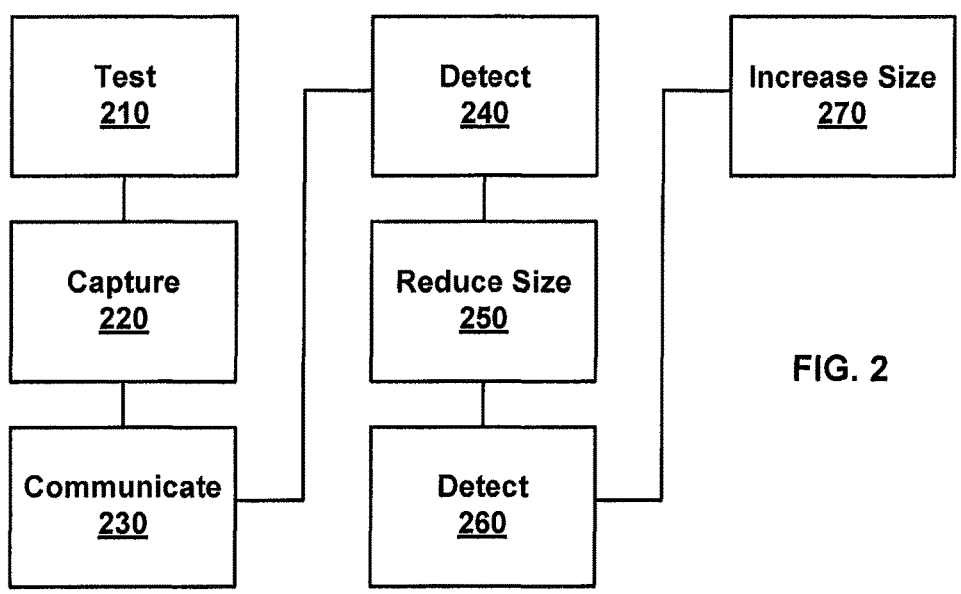
FIG. 2 illustrates a method of communicating images, according to various embodiments of the invention.

FIG. 2 illustrates a method of communicating images, according to various embodiments of the invention. The images are communicated such that an image captured shortly after movement of Access Device 110 is not reduced in quality as a result of the movement. Rather, Video Transmission Logic 150 is used to restore image quality shortly after movement has ended, the restoration being in response to an output of Motion Sensor 145. The steps illustrated in FIG. 2 may overlap in time.

In an optional Test Step 210, Test Logic 160 is used to test the communication channel between Access Device 110 and Remote Destination 120. The testing detects a response of the communication channel to an increase in data size communicated to Remote Destination 120. Specifically the testing results in detection of modification of a sequence of images at a bandwidth threshold. The detected modification being in response to the increase in data size. For example Test Step 210 may determine that above X Mb/s the image sequence is reduced in resolution. The testing may be performed using stock image data or non-image data. Optionally, the detected modification of the sequence of images is a result of limitations of the communication channel and is not under the control of Access Device 110.

In a Capture Step 220, a sequence of images is captured using Camera 125. The sequence may be a video or a set of still images. Capture Step 220 may be performed using a default function of Access Device 110 or an specialized application installed on Access Device 110. The specialized application is optionally configured for communication to Agent Interface 165 on Remote Destination 120.

In a Communicate Step 230, the sequence of images captured in Capture Step 220 is communicated to Remote Destination 120 via Network 115. The communication is optionally via a wireless embodiment of Output 155. Communicate Step 230 can include compression of the images using any known compression algorithm. The communication is typically in real-time, e.g. some images of the image sequence are communicated as other images of the image sequence are captured.

In a Detect Step 240, an increased movement of Camera 125 is detected during the communication of the captured images to Remote Destination 120. The increased movement may be detected using Motion Sensor 145 or may be inferred from a command sent to a motor or actuator configured to move Camera 125. Typically, the detection will include a measure of the magnitude of the movement.

In a Reduce Size Step 250, the data size of the image sequence, as communicated to Remote Destination 120, is reduced in response to the movement increase detected in Detect Step 240. As discussed herein, there a variety of ways in which the data size can be reduced including a reduction in frame rate and/or a reduction in resolution. Reduce Size Step 250 is optionally performed under the control of Video Transmission Logic 150 in response to detection of movement and/or data size that is greater than a predefined threshold. This threshold may be determined in Test Step 210.

In a Detect Step 260, a reduced movement of Camera 125 is detected during communication of the captured images to Remote Destination 120. The decreased movement may be detected using Motion Sensor 145 or may be inferred from a command sent to a motor or actuator configured to reduce movement of Camera 125.

In an Increase Size Step 270, the data size of the sequence of images is increased in response to the decrease in movement detected in Detect Step 260. In various embodiments, the increase is accomplished within 0.1, 0.25, 0.5 1, 1.5, 2, 3 or 4 seconds of the end of the movement. The increase may be up to the data size of the image sequence prior to Reduce Size Step 250 or up to some other data size. The increase can be accomplished by restoring the frame rate at which the sequence of images is communicated, by restoring resolution of the images, and/or the like. A magnitude of the increase in data size is optionally proportional to a magnitude of the detected decrease in movement. The result of the increase in data size is that an image recorded shortly after the movement ends can be of a better quality, than would otherwise have occurred.

Several embodiments are specifically illustrated and/or described herein. However, it will be appreciated that modifications and variations are covered by the above teachings and within the scope of the appended claims without departing from the spirit and intended scope thereof. For example, while mention is made of a customer support system is made, Remote Destination 120 may have a wide variety of alternative purposes.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. A mobile video recording device comprising: a camera configured to record video; a motion sensor configured to detect movement of the video recording, device; a wireless output including an antenna and configured to communicate the video; a video transmission logic configured to reduce a data size of the video communicated via the wireless output, the reduction being in response to an output of the motion sensor and further in response to an identity of a destination of the video, wherein the destination is a customer relationship management system, the output of the motion sensor being indicative that the video recording device is being moved; and a microprocessor configured to execute at least the video transmission logic, wherein the video transmission logic is further configured to communicate the video to a customer relationship management system such that a quality of the video following the detected movement is not reduced by the detected movement for more than 0.5 second.

2. The device of claim 1, wherein the data size of the video is reduced by reducing a frame rate of the video.

3. The device of claim 1, wherein the data size of the video is reduced by reducing a resolution of the video.

4. The device of claim 1, wherein the data size of the video is reduced by changing a compression of the video.

5. The device of claim 1 wherein the data size of the video is reduced by changing frame types of the video.

6. The device of claim 1, wherein the data size of the video is reduced by changing a pixel depth of the video.

7. The device of claim 1, wherein the reduction is proportional to the output of the motion sensor.

8. The device of claim 1, wherein the video transmission logic is configured to restore the data size of the video to a prior value in response to detecting that the video recording device has stopped moving.

9. The device of claim 1, wherein the reduction in data size of the video is such that a bandwidth threshold of a communication channel is not reached.

10. The device of claim 1, further comprising test logic configured to test a communication channel to detect a modification of the video at a bandwidth threshold of the communication channel.

11. A method of communicating video, the method comprising:
   capturing a sequence of images using a camera;
   communicating the sequence of images to a remote destination via a wireless output;
   detecting an increased movement of the camera, using an output of a motion sensor, while communicating the sequence of images;
   reducing a data size of the sequence of images in response to the detected increased movement and proportional to the output of the motion sensor;
   increasing the data size of the sequence of images after a two second interval from detecting the increased movement of the camera, during which interval no reduced movement of the camera is detected.

12. The method of claim 11 further comprising testing the response of a communication channel to an increase in data size communicated to the remote destination, the testing resulting in detection of modification of the sequence of images at a bandwidth threshold, wherein the step of reducing the data size is performed to keep the data size of the sequence of images below the bandwidth threshold.

13. The method of claim 11, wherein the data size of the sequence of images is reduced by reducing a frame rate at which the sequence of images is communicated.

14. The method of claim 11, wherein the data size of the sequence of images is reduced by reducing a resolution of images within the sequence of images.

* * * * *